United States Patent Office 2,742,473
Patented Apr. 17, 1956

2,742,473
CHLORMETHYLATED ARYL IMIDES

David I. Randall, Easton, Pa., and Edgar E. Renfrew, Phillipsburg, N. J., assignors to General Aniline & Film Corporation, New York, N. Y., a corporation of Delaware No Drawing. Application April 27, 1953,
Serial No. 351,475

5 Claims. (Cl. 260—281)

This invention relates to chloromethyl derivatives of naphthalene and substituted naphthalene imides. More particularly, the invention relates to the chloromethyl derivatives of N-substituted peri imides of naphthalene and derivatives thereof, wherein the N-substituent is an aryl radical which may be substituted in the ring.

The compounds of the present invention are characterized by the following general formula:

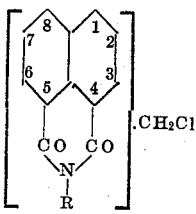

wherein R is an aryl group which may be substituted in the ring as by alkyl, alkoxy and halo groups. The rings of the naphthalene portion of the molecule may be further substituted by nitro, halo and alkyl groups.

The chloromethyl derivatives are produced by dissolving the imide in concentrated sulfuric acid and introducing bischloromethyl ether. The process involves stirring the reaction mixture at temperatures of from 30 to 80° C. for several hours. The activity of the chloromethylation reaction and hence the reaction time and the entering position or positions of the chloromethyl groups depends somewhat upon the blocking and directing influences of substituent groups. In general, the initial introduction of a chloromethyl group is para to the nitrogen linkage but the position for each compound will depend upon substituent groups and the extent of the chloromethylation and it is possible that chloromethyl groups enter the naphthalene nucleus.

The following examples are illustrative of the preferred embodiments of the invention but it will be understood that the invention is not limited thereto and variations and substitutions may be made within the scope of the claims. The proportions in the examples are by weight.

Example 1

Twenty parts N-o-tolyl-4-nitro-1,8-naphthalimide were dissolved in 184.0 parts of sulfuric acid (99.4%). Then were added 15 parts bischloromethyl ether. The solution was stirred for four hours at room temperature. It was poured with stirring into 1500.0 parts water containing ice. The material which precipitated was collected on a filter and washed with water until the washings were neutral. The cake after drying weighed 23.9 parts. Analysis showed it to contain 10.7% chlorine. A product bearing one chloromethyl group has the formula $C_{20}H_{13}O_4Cl$; $Cl = 9.3\%$ It has the probable structure N-(p-chloromethyl-o-tolyl)-4-nitro-1.8-napthalimide.

Example 2

Exactly as Example 1 except that 20.0 parts N-phenyl-4-nitro-1,8-naphthalimide were used instead of N-o-tolyl-4-nitro-1,8-napthalimide. The product weighed 22.5 parts; analysis showed it to contain 9.% chlorine. A product bearing one chloromethyl group has the formula $C_{19}H_{11}O_4N_2Cl$; $Cl = 9.7\%$ The product is probably N-(p-chloromethylphenyl)-4-nitro-1,8-naphthalimide.

Example 3

Exactly as Example 1, except that 23.0 parts N-o-tolyl-1,8-naphthalimide were used instead of N-o-tolyl-4-nitro-1,8-naphthalimide. The dry product weighed 25 parts. Analysis showed it to have 16.1% chlorine. A product bearing one chloromethyl group has the formula $C_{16}H_{12}NCl$; $Cl = 12.4\%$ The product is probably N-(p-chloromethyl-o-tolyl)-1,8-naphthalimide.

Example 4

Twenty-two parts N-p-tolyl-1,8-naphthalimide were dissolved in 184.0 parts sulfuric acid (99.4%). Then were added 15.0 parts bischloromethyl ether. The solution was stirred for four hours at room temperature, after which it was poured into 1500.0 parts water and ice. The material which precipitated was collected on a filter and washed with water until the washings were neutral. The cake after drying weighed 25.0 parts. Analysis showed it to contain 13.3% chlorine. $C_{20}H_{13}O_4N_2Cl$ contains 9.7% chlorine. The product of the reaction is N-(chloromethyl-p-tolyl)-1,8-naphthalimide.

The compounds of the present invention are intermediates which are useful in forming dyes and germicidal agents. The intermediates are useful in several types of syntheses. For instance, the compounds when heated with certain thioureas such as 1,3-dimethylthiourea, 1,1,3-trimethylthiourea, or 2-imidazolidmethione form quaternary salts which are easily soluble in water; these materials are useful as intermediates for cotton and silk printing colors and as dyestuffs for paper. The 1-nitro-chloromethylated N-substituted phthalimide may be reduced to the corresponding 1-amino product which is useful as an ultra-violet absorber. The chloromethyl groups are also capable of reacting with phenols, amines, mercaptans and other materials. In general, the naphthalene compounds are colorless.

The aryl radicals of the aryl groups which undergo chloromethylation can be mono- or polycyclic, e. g., of the benzene, biphenyl, diphenyl methane, anthracene, phenanthrene, or naphthalene series, but are preferably monocyclic. They can be substituted in one or more nuclear positions by substituents which are unreactive toward the chloromethylating agent under the conditions of chloromethylation, provided that at least one reactive position remains unoccupied. Suitable unreactive substituents are, for example, lower alkyl (e.g., methyl, ethyl) groups, lower alkoxy (e.g., methoxy, ethoxy) groups, halogen (e.g., chlorine, bromine).

The following are examples of some of the aryl radicals which form the N-substituent in the imide: phenyl, o-tolyl, p-tolyl, 2-chloro-p-tolyl, 2,3,4-trichlorophenyl, 2-ethyl-p-tolyl, 2,4-xylyl, 2,5-xylyl, 3,4-xylyl, p-phenoxyaniline, p-biphenyl, α- or β-naphthyl, p-chlorophenyl.

This application is a continuation-in-part of our application Serial No. 143,818, filed on February 11, 1950, now abandoned.

We claim:

1. A chloromethyl derivative selected from the group consisting of N-substituted naphthalene peri imides and the alkyl, alkoxy and halo derivatives thereof, wherein the N-substituent is an aryl radical.

2. Chloromethyl nuclear substituted N-o-tolyl-4-nitro-1,8-naphthalimide.

3. Chloromethyl nuclear substituted N-phenyl-4-nitro-1,8-naphthalimide.

4. Chloromethyl nuclear substituted N-p-tolyl-1,8-naphthalimide.

5. Chloromethyl nuclear substituted N-o-tolyl-1,8-naphthalimide.

References Cited in the file of this patent

UNITED STATES PATENTS 2,544,825     Coffey et al. _____ Mar. 13, 1951